United States Patent Office 2,754,278
Patented July 10, 1956

2,754,278

ETHYLENE-HIGHER ALKANOL POLYMER WAX

Howard L. Wilson, Raritan Township, Middlesex County, Andrew F. Sayko, Westfield, and Raymond G. Newberg, Roselle Park, N. J., assignors to Esso Research and Engineering Company, a corporation of Delaware No Drawing. Application July 30, 1952,
Serial No. 301,788

20 Claims. (Cl. 260—28.5)

This invention relates to a process for catalytic polymerization of ethylene, the products produced thereby and the production of improved wax compositions by incorporation of the ethylene products in waxes such as paraffin waxes.

It is known that liquid to solid polymers may be prepared by heating ethylene at controlled temperatures under superatmospheric pressures in the presence of specific catalysts, employing reaction media of either the aqueous or organic type, or in the absence of a reaction media.

It is known that liquid to solid polymers may be prepared by heating ethylene at controlled temperatures above the decomposition temperature of initiating catalysts which decompose to free radicals such as peroxides, hydroperoxides, oxygen, etc. The reaction is usually carried out at superatmospheric pressures, generally above 50 atmospheres, employing reaction media of either the aqueous or organic type. In other cases, the polymer of ethylene may be prepared by mass polymerization in the absence of another reaction media.

It has now been found possible to polymerize ethylene in a media of 1 or more high molecular weight alcohols which are substantially water-insoluble and which preferably contain at least 8 or more up to about 18 carbon atoms. Branched chain alcohols such as iso-octyl, iso-decyl, nonyl, isotridecyl, as well as straight chain alcohols such as 1-octanol, 1-decanol, and 1-dodecanol are used in the reaction media to produce useful products. The polymerization of the ethylene in the preferred high molecular weight alcohol reaction media is initiated by organic and inorganic peroxides. The reaction temperature is controlled above the decomposition point of the particular peroxide used as the initiator. The temperature employed will generally be above 100° C. The ethylene pressure should be maintained at pressures of at least 750 and up to 10,000 p. s. i. g.

In the past, it has been known to produce ethylene polymers in the presence of the low molecular weight water-soluble alcohols. U. S. Patent No. 2,504,400 employs as the reaction media isopropyl alcohol of 90% purity or better with a catalyst of hydrogen peroxide and uses a pressure of 6,250 to 7,000 p. s. i. g. and temperatures of 140 to 170° C. A waxy ethylene polymer has also been produced using methanol as the reaction media and an organic peroxide catalyst. Other low molecular weight alcohols which have been employed as reaction media in the high pressure polymerization of ethylene include tertiary butyl alcohol and other butyl alcohols.

This invention is distinguished from the processes of the prior art in that it employs the high molecular weight alcohols having 8 or more carbon atoms as the reaction media for preparing novel products of ethylene polymerization.

It has been found that the products from this novel polymerization are hard, waxy polymer products if the pressure is maintained above 2,000 p. s. i. g. Products which are produced at pressures below 2,000 p. s. i. g. vary from viscous liquids to semi-solid materials of soft wax-like consistency. These products are all particularly useful for improving the quality of hydrocarbon waxes, especially those which are to be incorporated into paper or fabric or other cellulosic material into which the wax-polymer blend is readily absorbed. When the coated paper is employed as a wrapper, the lapped edges are readily heat sealed into each other and the presence of the particular polyethylene polymers prepared by this process markedly increase the strength of the coating mixture and the strength of the resultant seal. At the same time, the presence of the polyethylene, which raises the temperature of the blend fusion point and reduces the tendency toward pressure flow of the paraffin, substantially raises the "blocking point," and makes it possible to stack in piles the impregnated and cut sheets of paper or fabric without adherence and thereby facilitates the use of the coated paper in automatic commercial wrapping operation. It has thus been discovered, quite surprisingly, that the use of $C_8$ and higher molecular weight alcohols as the media for polymerizing ethylene produces a polyethylene which imparts superior sealing strength to blends of wax and the polyethylene.

In carrying out the process of this invention, there is used ethylene of 95 to 100% purity. The reaction is carried out by subjecting the ethylene to polymerization in the appropriate media at temperatures ranging from about 100° C. up to 300° C. and at pressures between 750 and 10,000 p. s. i. g. The reaction media employed may consist of any of the higher, water insoluble, aliphatic alcohols having 8 or more carbon atoms. Both the straight chain and branch chain higher alcohols can be used. However, it has been found that the straight chain alcohols give somewhat higher sealing strengths when the resulting polyethylene is incorporated into paraffin wax or which are used for paper coatings. It is especially desirable to employ as the reaction media, the so-called "Oxo" alcohols which are prepared by the oxonation of olefins. For instance, if a $C_7$ olefinic stream is subjected to the oxonation reaction, which is coreaction of olefin with CO in the presence of $H_2$ and cobalt by hydrogenation of the product over a suitable catalyst, a mixture of $C_8$ alcohols is obtained which is especially useful as a reaction media in this novel polymerization process. It is not necessary that the higher molecular weight alcohol be a single, pure chemical entity but it may be a mixture of isomeric alcohols and, in fact, this may be the most economical and available reaction media. The "isooctyl alcohol" produced by oxonation is an example of such a mixture of isomeric alcohols. Although other compounds, including liquids, may be present, it is preferred to operate with a reaction media consisting substantially of the higher molecular weight alcohols.

Among the catalysts and initiators which can be employed in carrying out the process of this invention and which are commonly known as polymerization catalysts, there are included molecular oxygen and the per-oxygen or peroxide compounds both of the organic and inorganic classes such as lauroyl peroxide, di-tertiary butyl peroxide, benzoyl peroxide, furoyl peroxide, cumene hydroperoxide, dimethyl peroxide, tertiary-butyl hydroperoxide, benzoperacid, and acetoperacid; as well as hydrogen peroxide.

Although the amount of polymerization catalyst may vary somewhat, it is generally employed in proportions of from 0.001% up to 5% of the total weight of monomers. The polymerization catalyst concentration is preferably included in the range of about 0.05 up to about 3% of the total reaction mixture.

The vessel used in carrying out this invention must be fabricated of materials capable of withstanding the conditions of temperature and pressure employed. That portion of the equipment which comes into actual contact with the polymerization system should preferably be made from or lined with a material which does not corrode rapidly, or which will not affect the reactants. Suitable materials of construction as well as linings include glass, enamel, silver, aluminum, tin, stainless steels which contain 18–20% chromium and 8–14% nickel, nickel, and manganese alloys containing high proportions of nickel.

The polymerization may be carried out batchwise, continuously or semi-continuously. Agitation may be provided such as by the use of stirring or shaking machines in batchwise operation, or by the use of baffles in case of continuous operation or by turbulent flow in reactors having a high ratio of length to cross section. The polymer is recovered from reaction media by extracting reaction media three times with methanol. Polymer is separated each time by filtration from the slurry. Then methanol is vacuum stripped from the polymer.

The reaction to give the polyethylene is exothermic but is readily controlled by the use of cooling coils or an external cooling jacket and it produces a white, hard waxy solid. This polyethylene polymer may have a Staudinger molecular weight of from 800 to about 5,000. This material can be blended with petroleum waxes to give wax-polyethylene mixture having increased sealing strength, better "blocking" and having improved surface gloss when coated on paper.

To prepare the novel compositions of matter comprising the paraffin wax and the polyethylene, the polymer may, if desired, be placed in a kneader, to which the paraffin wax, preferably molten, is added until the appropriate amount of paraffin wax has been well incorporated into the waxy solid polymer and the polymer is well in solution. The amount of the polymer to be used varies somewhat with the melting point of the wax employed, as well as with the molecular weight of the polyethylene polymer, but normally is from 0.5% up to 20% by weight, and is preferably about 1% to 5% by weight.

The resulting wax-polyethylene mixture melts readily at temperatures between about 70 and 150° C., depending on the initial melting point of the wax, and is readily incorporated into paper or other fabric material.

TESTING AND EVALUATION

*Molecular weight.*—The solution viscosity technique has been employed for determining average molecular weights of polyethylene polymers. Viscosity measurements are made at 85° C. with dilute (10 mg./cc.) solutions of polymer in xylene and the data converted to molecular weight by Staudinger's equation, wherein the constant $K=0.85\times10^{-4}$. The comparatively high temperature level is necessary because of the extremely poor solubility of the polymers at ordinary temperatures.

*Preparation of polymer-wax blends.*—The 1% polymer-wax blends employed for sealing strength, blocking temperature and cloud point determinations were prepared by blending at 225° F.–250° F. Excessive temperatures were avoided in order to avoid wax breakdown. The time required for complete solution of the polymer into the molten wax was noted to give a measure of polymer solubility. Solutions are instantaneous above the cloud point of the polymerizate blend.

*Cloud point determination.*—The temperature at which the polymer will start to precipitate from the wax blend is designated as the cloud point. This point governs the temperature level at which any coating or impregnating operation may be conducted. Cloud points are obtained by heating the wax blend until a clear solution is obtained and then noting the temperature at which a cloud appears as the blend is slowly cooled.

In some cases a clear point is desired. This is the point at which a clear solution is obtained as the blend is heated. A clear point is ordinarily from 3° F. to 10° F. higher than the corresponding cloud point.

*Preparation of coated sample strips.*—Specimens for evaluating sealing strength and blocking temperature are prepared by coating a white opaque sulfite paper (bread-wrap stock) having a basic weight of 24.0–26.5 lbs. per ream (500—24" x 36" sheets). A suitable apparatus for preparing hand-waxed paper strips comprises a rack for the unwaxed paper, a hot plate, wax bath, steam heated wire wound "doctor" rods to give smooth and uniform wax films, and a water bath to quickly chill the wax coating.

With the wax blend at 200° F.±50° F., the paper strip is pulled through the apparatus at a rate of approximately ½ foot/sec. If the strip is pulled too fast, the surface will have cracks or pock marks somewhat similar to a herringbone design. A slow pulling rate gives ridges across the strip and usually a poorer gloss is obtained. The desired coating has a smooth, high gloss surface.

*Blocking point determination.*—Wax blocking is defined as the lowest temperature at which waxed papers will stick together sufficiently to permanently injure the surface films and performance properties. Briefly, the test used consists of placing a pair of hand-coated waxed papers on a metal bar having a 55–65° F. temperature gradient along its length. After several hours, the strips are removed and the point of first distinct blocking is noted. The temperature corresponding to this point is obtained from the calibration curve for the instrument.

The first section of the tested strip should be smooth and generally glossy. A fairly sharp point will be observed where the surface is suddenly dull and marked.

*Sealing strength.*—For all packaging applications the seal between overlapping sheets of coated paper must resist failure from repeated handling. The sealing strength is a measure of the amount of force required to separate two sheets of wax coated paper which have been heat sealed. Specimens are prepared by lightly pressing together two wax coated strips of paper at 200° F. with a stainless steel roller (weight=98 gm.). These strips are cooled immediately by immersing them in a water bath held at 70° F. This cooling temperature must be consistent for all samples since sealing strength varies considerably with cooling temperature.

Sealing strength data are obtained by measuring the force needed to pull apart a 1" x 4" sealed specimen. The Twing tear tester apparatus is employed for this determination.

The invention is illustrated by the examples shown below, but it is not intended to limit the scope of the invention in any way thereto. All parts are by weight unless otherwise indicated.

Example I

The polymerization was carried out in a pressure autoclave equipped with a mechanical agitator and suitable safety devices for operation at 10,000 p. s. i. g. Twelve hundred cc. (997 g.) of isooctyl alcohol prepared by the oxonation of a $C_7$ olefin stream and 3.52 g. of di-tertiary butyl peroxide were introduced into the three liter vessel. After closing the fill-port, ethylene was purged through the unit twice to eliminate air. Then the 99.5% pure ethylene was introduced into the autoclave by means of a plunger pump until the pressure of 2,200 p. s. i. g. was obtained at 25.7° C. Heat by means of hot circulating oil in the autoclave jacket was applied until the reaction started at 108° C. The temperature was maintained between 108 and 114° C. for 26 minutes during which time the pressure decreased from 6000 p. s. i. g. to 5250 p. s. i. g. At this point, the reaction was rapidly chilled and reaction ceased. The product was then discharged into a receiver. The polymer product was dispersed in the cold alcohol. After three washings of the product with methanol, followed by filtering off the liquor, the solid was vacuum dried by heating to 200° C. at 1 mm.

pressure. After cooling, the product was a hard waxy solid. This material has a Staudinger molecular weight of 2,270.

*Example II*

Experiments were carried out, details of which are shown in Table I to indicate the effect of using the low molecular weight aliphatic alcohols as reaction media for the preparation of polyethylene, which was used in blends with paraffin wax. The reactions, runs Nos. 1–4, inclusive, were carried out similarly to Example I using di-tertiary-butyl peroxide as the initiator.

TABLE I

| Run No. | Reactant Medium | Staud. Mol. Wt. | Evaluation as 1% Blends in 130/132 M. P. Paraffins | | |
|---|---|---|---|---|---|
| | | | Cloud Pt., °F. | Blocking Temp., °F. | Sealing Strength |
| 1 | Methanol | 2,380 | 196 | 128 | 32.6 |
| 2 | n-Butanol | 1,950 | 190 | 130 | 45.1 |
| 3 | Sec-Butanol | 1,640 | 194 | 129 | 48.0 |
| 4 | tert-Butanol | 5,480 | 194 | 128 | 46.0 |
| Control [1] | isopropyl alc. $H_2O_2$ cat. | | 186.5 | 128 | 37.7 |

[1] Example prepared according to U. S. Patent 2,504,400.

Although it can be noted that the sealing strengths of the blends prepared from the polyethylene using alcohol reaction media are somewhat higher than those of the commercial control product, a comparison of this data with the values shown in Table III below, indicate clearly that those of the invention (Table III) are highly superior. In fact, the sealing strength measurements shown in Table III below are in an entirely different class than those obtained in the experiments shown in Table I.

*Example III*

A series of experiments was carried out in order to demonstrate the versatility of the invention employing different high molecular weight water insoluble alcohols. The data of this series of experiments are shown in Tables II and III. In general the experiments were carried out in the same manner as described in Example I.

Runs Nos. 5–10, inclusive, show the results obtained with reaction media consisting of aliphatic alcohols having 8 or more carbon atoms. Runs 1 and 2 from Example II, Table I are included in Tables II and III in order to show the comparatively much lower sealing strengths obtained by the low molecular weight alcohols which have been described in the prior art. It should be noted that the sealing strength values are relatively higher for the normal or straight chain alcohols than for those of the branched chain alcohols, although both types of high molecular weight alcohols give very superior results to the alcohols previously used.

What is claimed is:

1. In a process involving the polymerization of ethylene at a temperature between 100° and 150° C. and pressure of about 2,000 to 7,000 p. s. i. g. in the presence of di-tertiary-butyl peroxide as the polymerization initiator, the step which comprises conducting the polymerization in a liquid reaction media consisting of at least 1 water-insoluble alkanol having from 8 to 15 carbon atoms.

2. A process for the production of waxy solids from ethylene which comprises maintaining ethylene under pressure between about 750 and 10,000 p. s. i. g. and at temperatures between about 100° and 300° C. in the presence of liquid reaction media consisting substantially of branch chain $C_8$ water-insoluble alkanols and in contact with from about 0.05 up to about 3% of a peroxide polymerization catalyst.

3. A waxy, solid product consisting substantially of polymerized ethylene and prepared by the process of claim 2.

4. A composition of matter comprising from 1% to 10% by weight of polymerized ethylene produced as described in claim 2 and from 99% to 90% of paraffin wax.

5. An article of manufacture comprising paper coated with the composition described in claim 4.

6. A process for the preparation of solid ethylene polymers which comprises heating ethylene in the presence of a straight chain alkanol having 8 to 18 carbon atoms and a peroxide polymerization catalyst, at a temperature of 100° to 150° C. under a pressure of 750 to 10,000 p. s. i. g.

7. A process for the preparation of solid ethylene polymers which comprises heating ethylene in the presence of at least one aliphatic alcohol having from 8 to 15 carbon atoms, at a temperature of 100° to 150° C. under a pressure of about 4,000 to 7,000 p. s. i. g. in the presence of di-tertiary-butyl peroxide for a period of time from 20 to 68 minutes.

8. Process according to claim 6 using an alkanol of 8 to 12 carbon atoms.

9. In a process for the polymerization of ethylene the combination which comprises maintaining ethylene under pressure between about 750 p. s. i. g. to 10,000 p. s. i. g. and at a temperature between about 100° C. and 300° C.

TABLE II.—POLYMERIZATION OF ETHYLENE IN HIGHER ALCOHOL MEDIA

| Run No. | Reactor Media | | | Ethylene | | Temp. Range, °C. | Elapse Reaction Time, Min. | Yield, g. |
|---|---|---|---|---|---|---|---|---|
| | Material | Quantity, g. | Catalyst Quantity, g. | Purity, percent | Pressure Range, p. s. i. g. $\times 10^{-3}$ | | | |
| 1 | Methanol | 1,095 | 4.06 | 99.5 | 6.4–5.3 | 100–116 | 50 | 81 |
| 2 | n-Butanol | 973 | 4.08 | 99.5 | 7.3–6.0 | 112–120 | 27 | 125 |
| 5 | Isooctanol [1] | 1,037 | 4.03 | 99.5 | 6.0–5.3 | 100–114 | 40 | 52 |
| 6 | Iso-decyl alcohol [1] | 1,002 | 2.13 | 95 | 6.5–5.6 | 105–126 | 37 | 89.5 |
| 7 | Iso-tridecyl alcohol [1] | 1,018 | 2.13 | 99.5 | 5.5–4.5 | 115–120 | 50 | 59 |
| 8 | 1-Octanol | 1,010 | 3.55 | 95 | 5.9–5.4 | 105–117 | 68 | 77 |
| 9 | 1-Decanol | 997 | 2.16 | 95 | 6.5–5.5 | 113–129 | 20 | 114 |
| 10 | 1-Dodecanol | 1,010 | 2.14 | 95 | 5.0–4.1 | 110–121 | 32 | 110 |

[1] Prepared from corresponding UOP olefin by oxonation reaction.

TABLE III

| Run No. | Material | Staudinger Mol. Wt. | Screening Evaluation | | |
|---|---|---|---|---|---|
| | | | Cloud Pt., °F. | Blocking Temp., °F. | Sealing Strength, dynes/cm² |
| 1 | Methanol | 2,380 | 196 | 128 | 32.6 |
| 2 | n-Butanol | 1,950 | 190 | 130 | 45.1 |
| 5 | Isooctanol [1] | 2,250 | 196 | 123.5 | 67.2 |
| 6 | Iso-decyl alcohol [1] | 2,000 | 190 | 129 | 67.9 |
| 7 | Iso-tridecyl alcohol [1] | 1,980 | 191 | 128 | 100+ |
| 8 | 1-Octanol | 1,410 | 188 | 125 | 95.0 |
| 9 | 1-Decanol | 1,750 | 189 | 126 | 100+ |
| 10 | 1-Dodecanol | 1,270 | 188 | 128 | 100 |

[1] Prepared from corresponding UOP olefin by oxonation reaction.

in the presence of a peroxide polymerization catalyst in sufficient amounts to catalyze the reaction and in a medium of a substantially water-insoluble alkanol, having about 8 to 18 carbon atoms whereby to form a composition having a sealing strength of about 67 to 100 dynes per cm.$^2$.

10. In a process involving the polymerization of ethylene at a temperature between 100° C. and 300° C., at a pressure between 750 p. s. i. g. and 10,000 p. s. i. g., in the presence of a peroxide polymerization catalyst, the step which comprises conducting the polymerization in the presence of a substantially water-insoluble alkanol having from about 8 to 18 carbon atoms.

11. A solid polymerized ethylene prepared by the process which comprises maintaining ethylene under a pressure of between about 2000 and 7000 p. s. i. g. and at a temperature of between about 100° C. and 150° C. in the presence of sufficient quantities of di-tertiary-butyl peroxide to catalyze the reaction, and also in the presence of a medium of a water-insoluble alkanol having from about 8 to 18 carbon atoms.

12. A composition of matter consisting essentially of about 1% of a product prepared by the process which comprises maintaining ethylene under a pressure of between about 750 p. s. i. g. to 10,000 p. s. i. g. and at a temperature between about 100° and 150° C. in the presence of sufficient quantities of di-tertiary-butyl peroxide to catalyze the reaction and also in the presence of substantial quantities of a substantially water-insoluble alkanol containing from about 8 to 15 carbon atoms; said composition of matter also consisting essentially of about 99% of paraffin wax.

13. An article of manufacture comprising a fibrous cellulosic material coated with a composition of matter having a sealing strength of about 67 to 100 dynes/cm.$^2$ consisting of about 1% by weight of a product prepared by the process which comprises maintaining ethylene under pressure between about 750 p. s. i. g. and 10,000 p. s. i. g. and at a temperature between about 100° C. and 300° C., in the presence of a reaction medium comprising substantial quantities of a substantially water-insoluble $C_8$ to $C_{18}$ alkanol and sufficient quantities of a di-tertiary-butyl peroxide polymerization catalyst to catalyze the reaction; wherein the composition also consists essentially of 99% paraffin wax.

14. A composition of matter consisting of about 99% by wt. of paraffin wax and about 1% by wt. of a waxy solid made by polymerizing ethylene at 100° C. to 150° C. under a pressure of about 2,000 p. s. i. g. to 7,000 p. s. i. g., in the presence of a peroxide polymerization catalyst with a water-insoluble alkanol containing from about 8 to about 12 carbon atoms; said composition having a sealing strength in the range of about 67 to 100 dynes per cm.$^2$.

15. In a process for preparing an article of manufacture comprising a fibrous cellulosic material coated with a composition of matter consisting of about 99% by wt. of paraffin wax and about 1% by wt. of a waxy solid polymeric composition; the combination which comprises coating said fibrous cellulosic material with substantial quantities of a composition of matter consisting of about 99% by wt. of paraffin wax and about 1% by weight of a waxy solid made by polymerizing ethylene at about 100° C. to 300° C. under a pressure of about 750 p. s. i. g. to 10,000 p. s. i. g. in the presence of sufficient quantities of a peroxide polymerization catalyst to catalyze the reaction and in the presence of a medium of a substantially water-insoluble alkanol containing at least 8 but not more than about 18 carbon atoms; said composition of matter having a sealing strength in the range of about 67 to 100 dynes per cm.$^2$ whereby to form an article of manufacture having a smooth, high-gloss surface of improved sealing strength.

16. An article of manufacture comprising a fibrous cellulosic material coated with a composition of matter having a sealing strength of about 67 to 100 dynes/cm.$^2$ consisting of about 1% by wt. of a product prepared by the process which comprises maintaining ethylene under pressure between about 750 p. s. i. g. and 10,000 p. s. i. g. and at a temperature between about 100° C. and 300° C., in the presence of a reaction medium comprising substantial quantities of a substantially water-insoluble $C_8$ to $C_{18}$ alkanol and sufficient quantities of a peroxide polymerization catalyst to catalyze the reaction; wherein the composition also consists essentially of 99% paraffin wax.

17. A composition of matter consisting essentially of about 1% of a product prepared by the process which comprises maintaining ethylene under a pressure of between about 750 p. s. i. g. to 10,000 p. s. i. g. and at a temperature between about 100° and 150° C. in the presence of sufficient quantities of a peroxide catalyst to catalyze the reaction and also in the presence of substantial quantities of a substantially water-insoluble alkanol containing from about 8 to 15 carbon atoms; said composition of matter also consisting essentially of about 99% of paraffin wax.

18. A solid polymerized ethylene prepared by the process which comprises maintaining ethylene under a pressure of between about 2,000 and 7,000 p. s. i. g. and at a temperature of between about 100° C. and 150° C. in the presence of sufficient quantities of a peroxide catalyst to catalyze the reaction and also in the presence of a medium of water-insoluble alkanol having from about 8 to 18 carbon atoms.

19. A composition of matter consisting of about 99% by wt. of paraffin wax and about 1% by wt. of a waxy solid made by a polymerizing ethylene at 100° to 150° C. under a pressure of about 2,000 p. s. i. g. to 7,000 p. s. i. g. in the presence of a polymerization catalyst comprising an alkyl peroxide with a water-insoluble, alkanol containing from about 8 to about 12 carbon atoms; said composition having a sealing strength in the range of about 67 to 100 dynes per cm.$^2$.

20. In a process for preparing an article of manufacture comprising a fibrous cellulosic material coated with a composition of matter consisting of about 99% by wt. of paraffin wax and about 1% by wt. of a waxy solid polymeric composition; the combination which comprises coating said fibrous cellulosic material with substantial quantities of a composition of matter consisting of about 9% by wt. of paraffin wax and about 1% by weight of a waxy solid made by polymerizing ethylene and about 100° C. to 300° C. under a pressure of about 750 p. s. i. g. to 10,000 p. s. i. g. in the presence of sufficient quantities of a polymerization catalyst comprising an alkyl peroxide to catalyze the reaction and in the presence of a medium of a substantially water-insoluble alkanol containing about 8 to 18 carbon atoms; said composition of matter having a sealing strength in the range of about 67 to 100 dynes per cm.$^2$ whereby to form an article of manufacture having a smooth, high-gloss surface of improved sealing strength.

References Cited in the file of this patent

UNITED STATES PATENTS

| | | |
|---|---|---|
| 2,402,137 | Hanford | June 18, 1946 |
| 2,414,311 | Larson | Jan. 14, 1947 |
| 2,504,400 | Erchak | Apr. 18, 1950 |
| 2,523,705 | Lovell et al. | Sept. 26, 1950 |